United States Patent [19]

Tauscher et al.

[11] Patent Number: 4,996,881
[45] Date of Patent: Mar. 5, 1991

[54] VIBRATION TEST FIXTURE

[75] Inventors: Robert C. Tauscher, Hacienda Heights; Daniel L. Baughn, San Dimas; William B. Woyski, La Habra Heights, all of Calif.

[73] Assignee: Team Corporation, South El Monte, Calif.

[21] Appl. No.: 345,453

[22] Filed: Apr. 28, 1989

[51] Int. Cl.⁵ ............................................. G01M 7/02
[52] U.S. Cl. ......................................... 73/665; 73/663
[58] Field of Search .................. 73/663, 665, 668, 662

[56] References Cited

U.S. PATENT DOCUMENTS

| | | | |
|---|---|---|---|
| 3,164,984 | 1/1965 | Gertel | 73/665 |
| 3,208,270 | 9/1965 | Hill | 73/665 |
| 3,242,724 | 3/1966 | Ceparano et al. | 73/665 |
| 4,270,390 | 6/1981 | Kimball et al. | 73/663 |
| 4,440,026 | 4/1984 | Kimball | 73/663 |
| 4,498,343 | 2/1985 | Kimball | 73/663 |
| 4,783,999 | 11/1988 | Kimball | 73/665 |

OTHER PUBLICATIONS

"Team Tables and Fixtures," Team Corporation catalog, Sep. 1986, 22 pages.

Primary Examiner—Hezron E. Williams
Assistant Examiner—Rose Finley
Attorney, Agent, or Firm—Christie, Parker & Hale

[57] ABSTRACT

A vibration test fixture includes a reciprocating slip table carrying an article subjected to vibration and shock testing. The fixture includes low oil pressure hydrostatic linear bearings supporting the slip plate during single-axis linear travel on the bearings. The slip plate is mounted to each bearing by a single-axis guide system of confining the slip plate to reciprocating longitudinal travel on a general planar, two-dimensional bearing surface which supports the load of the slip plate during its travel. The guide system restrains relative movement of the slip plate laterally and vertically with respect to the bearing surface. A film of lubricating oil is supplied to the bearing surface to lubricate the sliding longitudinal travel of the slip plate on the bearings. The film of lubricating oil is also supplied to the lateral and vertical restraint areas of the bearing. The bearings produce controlled lubricated single-axis travel of the reciprocating slip plate while supporting the entire load of the slip plate and the article under test.

17 Claims, 6 Drawing Sheets

VIBRATION TEST FIXTURE

FIELD OF THE INVENTION

This invention relates to test equipment for simulating vibration and shock loads applied to an article under test, and more particularly, to a vibration test fixture having a linear bearing system with large oil film bearing surfaces for supporting the load of a vibrating test article during single-axis vibration and shock testing.

BACKGROUND OF THE INVENTION

The vibration test industry, including all major aerospace firms, automotive manufacturers, electronics companies, and the like, has adopted use of various methods and systems to simulate vibration and shock environments in order to determine their products' effectiveness and longevity when subjected to these environmental extremes. In order to obtain accurate test results, test laboratories maintain these dynamic tests in a controlled environment.

One parameter which can be important to control in vibration and shock test equipment is the axis of vibration. That is, certain test equipment will produce single-axis vibration of the article under test, while restraining any cross-axis vibration or motion which is not along the input axis of the vibration exciter.

Various types of oil film tables, bearings, bearing oil film table combinations, and flexure guidance systems are available today to support the test articles during vibration testing. One of the most successful types of vibration restraint systems available today is the hydrostatic journal bearing slip table, also known as the "Bearing Table." The first bearing table system manufactured for industrial applications was built in 1970 by Kimball Industries Inc., Monrovia, CA, in conjunction with Team Corporation, South El Monte, CA, the assignee of this application. Team Corporation designed and manufactured the internal hydrostatic journal bearings for the Bearing Table, while Kimball Industries designed and built the remainder of the granite slip table and support base. Kimball marketed the "Bearing-Line Table", as it was named, and eventually began manufacturing its own bearings based upon the original Team design, with minor variations.

The Bearing Table soon became the standard piece of equipment in the industry and was manufactured by other companies, including Ling Dynamic Systems, England; Turnkey Systems, City of Industry, CA; M-RAD Corporation, Woburn, MA; and Team Corporation. Other equipment manufacturers built similar granite slip tables with different guidance systems incorporated into the table, such as Unholtz-Dickie Corporation, Wallingford, CT, which uses low-pressure restraint guides at the corners of the table, and Ling Electronics, Anaheim, CA, which incorporates flexures at the rear of the granite table for additional mechanical guidance.

A common feature in the design of these tables is the use of a precision-ground granite slab which is lubricated with oil to create a slippery surface on which a magnesium slip plate slides during testing to support the article under test during vibration.

Although the Bearing Table has good performance, it is also characterized by the following problems which are inherent in its design:

1. A high-pressure hydraulic oil source is required to pressurize the hydrostatic journal bearings. The hydraulic power supply generally adds several thousand dollars to the cost of the table system. The power supply also can become a source of heat, which can adversely affect the table's performance.

2. Because the bearings are located at select locations within the granite table, the table's maximum load-carrying capabilities are located generally over these "bearing islands." Therefore, when the test articles are mounted to the slip plate in areas which are not supported by a bearing, the loads must be carried by the oil film/slip plate, which provides less load-carrying capacity.

3. In the event of a bearing failure, it is necessary for the manufacturer to send trained service personnel to the customer's facility to remove and replace the bearing. This requires the use of special shims and/or special machining of the bearing supports located within the granite table. This can be a costly and time-consuming procedure.

4. Most bearing table systems require porting of the magnesium slip plate to provide the bearings and granite slip surface with the necessary high-pressure oil. When smaller plates or replacement plates are used, they also must be ported, which creates additional costs. Also, the internal ports in the slip plates limit the positions of mounting inserts in the slip plate. If the inserts are installed near or on an existing oil port, the possibility of an oil leak exists, which, in most cases, requires major repairs or replacement of the slip plate.

5. When smaller slip plates are used on the tables, some of the bearings which are positioned beyond the perimeter of the small slip plates are unusable and, therefore, greatly reduce the table's performance.

6. The installation of journal bearings into a granite table requires large clearance holes in the granite for bearing clearance. These large openings reduce the table's overall load-carrying capacity.

7. The journal type hydrostatic bearings have considerable bending compliance.

The present invention provides a vibration test fixture in which a reciprocating slip plate is supported during vibration testing by a linear bearing system which overcomes the drawbacks of prior art vibration test fixtures, including the Bearing Table-type test equipment described above.

SUMMARY OF THE INVENTION

Briefly, one embodiment of the present invention provides a vibration test fixture having a slip plate to which a single-axis reciprocating motion is applied for vibration or shock testing of an article carried on the moving slip plate. A linear bearing supports the load of the slip plate (and the article under test) during reciprocating motion of the slip plate. The linear bearing has a generally planar, two-dimensional bearing surface for supporting the load while restraining cross-axis motion laterally and vertically with respect to the axis of motion. The entire load-supporting two-dimensional bearing surface area is lubricated with a thin film of oil, and the areas of multiple-axis restraint within the bearing also are lubricated with a thin film of oil during single-axis reciprocating motion of the slip plate. The linear bearing system thereby provides a means of bearing support for the entire load of the slip plate (and the article under test) on a constantly lubricated flat bearing surface during single-axis vibration, while also providing a constantly lubricated multiple-axis restraint means for the moving slip plate during testing.

In a preferred form of the invention, the bearing system includes an inverted T-shaped bearing guide member for mounting the slip plate for single-axis travel relative to the linear bearing support surface. The inverted T-shaped bearing guide member, combined with the oil film slip surfaces, provides a load capacity which exceeds the capacity of a standard high-pressure journal bearing/granite slip table system. The increased oil film area provides good control of vertical cross-axis motions, as well as increased damping of high-frequency resonances. The large film area also produces a bearing stiffness which is significantly greater than for a bearing table using journal bearings.

In one embodiment, the bearings of this invention may be distributed uniformly and located directly below the slip plate mounting surface. The bearing system can be arranged so that no matter where the test article is mounted on the table, it can always be supported by the bearings; or alternatively, at least as much bearing support as desired can be produced.

Another embodiment of the invention provides low-pressure oil ported through a base on which the bearing assembly is mounted. This eliminates the need for oil ports in the slip plate, and no expensive high-pressure pump is required.

These and other aspects of the invention will be more fully understood by referring to the following detailed description and the accompanying drawings.

DETAILED DESCRIPTION

Figure 1:
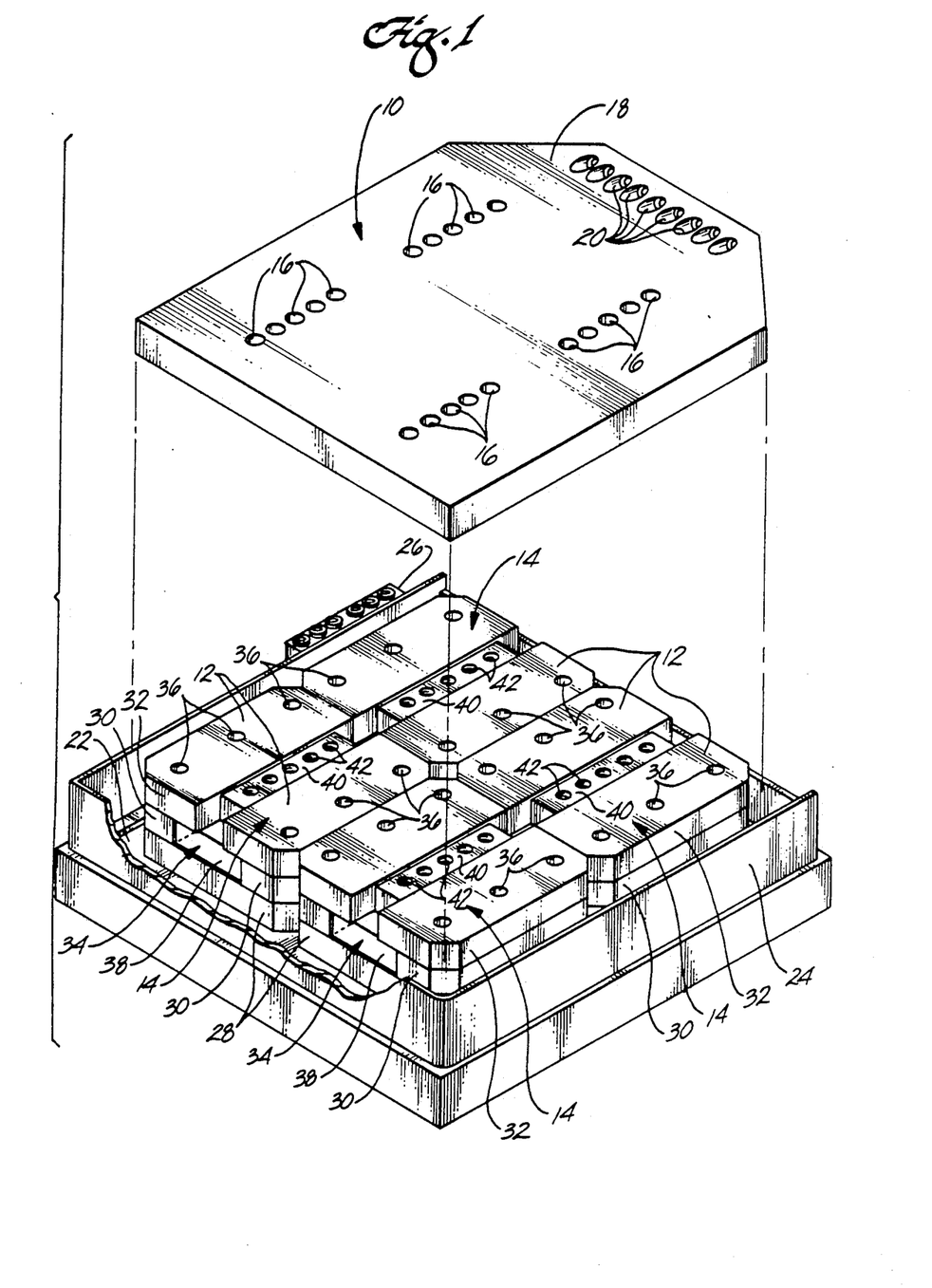
FIG. 1 is an exploded perspective view illustrating components of a vibration test fixture according to principles of this invention.

FIG. 1 illustrates components of a vibration test fixture according to principles of this invention. The fixture includes a rigid and generally planar slip plate 10 mounted for reciprocating linear travel on flat upper bearing surfaces 12 of a system of multiple linear support bearings 14. The slip plate is of generally uniform thickness and has a generally rectangular nominal surface area within a region of its bottom surface that is supported for linear travel on the upper bearing surfaces 12.

Separate groups of longitudinally spaced apart holes 16, preferably five holes in each group, extend through the slip plate. In the illustrated embodiment, two groups of five holes are aligned on a first axis, which defines an axis of travel of the slip plate; and two separate groups of five holes are aligned on a second axis parallel to the group of holes on the first axis. These groups of holes provide a means for receiving fasteners (described below) for rigidly securing the slip plate to a bearing guide member (described below) for guiding single-axis travel of the slip plate on the bearing surfaces 12.

Although the bottom surface (not shown in FIG. 1) of the slip plate can be flat for its entire bottom surface area, in a preferred arrangement, a pattern of relatively shallow recessed regions (not shown) extends in two mutually orthogonal directions across the bottom surface of the slip plate. These recessed regions are used to supply lubricating oil under low pressure to the bottom surface of the slip plate for lubricating its sliding travel back and forth on the upper bearing surfaces 12 during vibration testing.

One end portion 18 of the slip plate projects away from the bearing-supported surface portion of the slip plate. A row of equidistantly spaced apart holes 20 extends angularly through the end portion 18 of the slip plate. These holes receive fasteners (described below) for rigidly securing the slip plate to a means for applying a reciprocating linear force to the slip plate for shock and vibration testing of an article (not shown) affixed to the upper surface of the slip plate.

The drawings illustrate one embodiment of the test fixture in which four separate bearings 14 are mounted in side-by-side pairs to support the slip plate for its reciprocating travel on the bearing surfaces 12. The bearings 14, are rigidly affixed to the upper surface of a steel base plate 22, preferably of rectangular configuration. An upright outer wall 24 extends around the rectangular outer perimeter of the base plate 22, to provide a means of retaining lubricating oil contained within the fixture. A manifold 26 mounted to one edge of the base plate provides for filtration and recirculation of the lubricating oil through the bearings 14. The means for circulating the lubricating oil through the bearings 14 is described in more detail below.

Each bearing 14 is preferably a three-layer structure having a generally rectangular bottom plate 28; a pair of laterally spaced apart, long and narrow, generally rectangular middle plates 30 extending parallel to one another along opposite sides of the bottom plate; and a pair of laterally spaced apart, generally rectangular top plates 32 extending parallel to one another along opposite sides of the middle plates. The narrow middle plates form a wide, shallow bottom portion of an inverted T-shaped channel or groove 34 extending along the central axis of each bearing. (Although the axial groove 34 in each bearing is inverted T-shaped, they will be referred to below as T-shaped grooves for simplicity.) The top plates are wider than the middle plates and are spaced apart by a narrow gap which forms the narrow portion of the T-shaped channel in each bearing. The flat upper bearing surfaces 12 are formed by the tops of the top plates 32. The bearing surfaces 12 of the top plates are machined with extreme accuracy so as to lie in a common flat plane to provide bearing support for the bottom of the slip plate 10.

In the illustrated embodiment, the side walls of the adjacent pairs of bearings 14 abut against one another, and the end walls of bearing pairs aligned along a common axis defined by the T-shaped grooves also abut against one another. This produces a generally flat and continuous upper bearing surface occupying a large portion of the nominal bearing support surface area within the fixture.

Separate series of axially-aligned and uniformly spaced apart holes 36 extend through the upper plates 32. These holes are aligned with holes in the middle plates 30 and in the bottom plates 28. Fasteners (described below) extend through the holes 36 for rigidly securing each bearing 14 to the lower support plate 22 of the fixture.

The slip plate 10 is mounted for guided single-axis travel relative to the bearings 14 by separate inverted T-shaped guide members rigidly affixed to the bottom of the slip plate. These inverted T-shaped guide members (referred to below as T-shaped guide members) are shown unconnected to the slip plate 10 in FIG. 1 for clarity. Separate guide members are slidably engaged in corresponding T-shaped channels 34 in the bearings for guiding the slip plate during use. Each guide member is a two-component structure which includes (1) a relatively wide lower guide member bearing block 38 of generally rectangular configuration which slides in the wide bottom portion of the T-shaped channel, and (2) a relatively narrow upper guide member bearing block 40 of rectangular configuration which slides in the narrow upper portion of the T-shaped groove 34 during use. Each upper bearing block 40 is affixed to a corresponding lower bearing block 38 and is also rigidly affixed to the bottom of the slip plate. The bearing guides provide a means for guiding single-axis travel of the slip plate along the side-by-side pairs of aligned T-shaped channels 34 in the bearings 14. Separate series of holes 42 extend through each of the upper bearing block 40 and are aligned with corresponding holes 43 (shown in FIG. 2) in the lower bearing blocks to provide means for receiving threaded fasteners (described below) for rigidly affixing the T-shaped bearing guides to the bottom of the slip plate.

Figure 2:
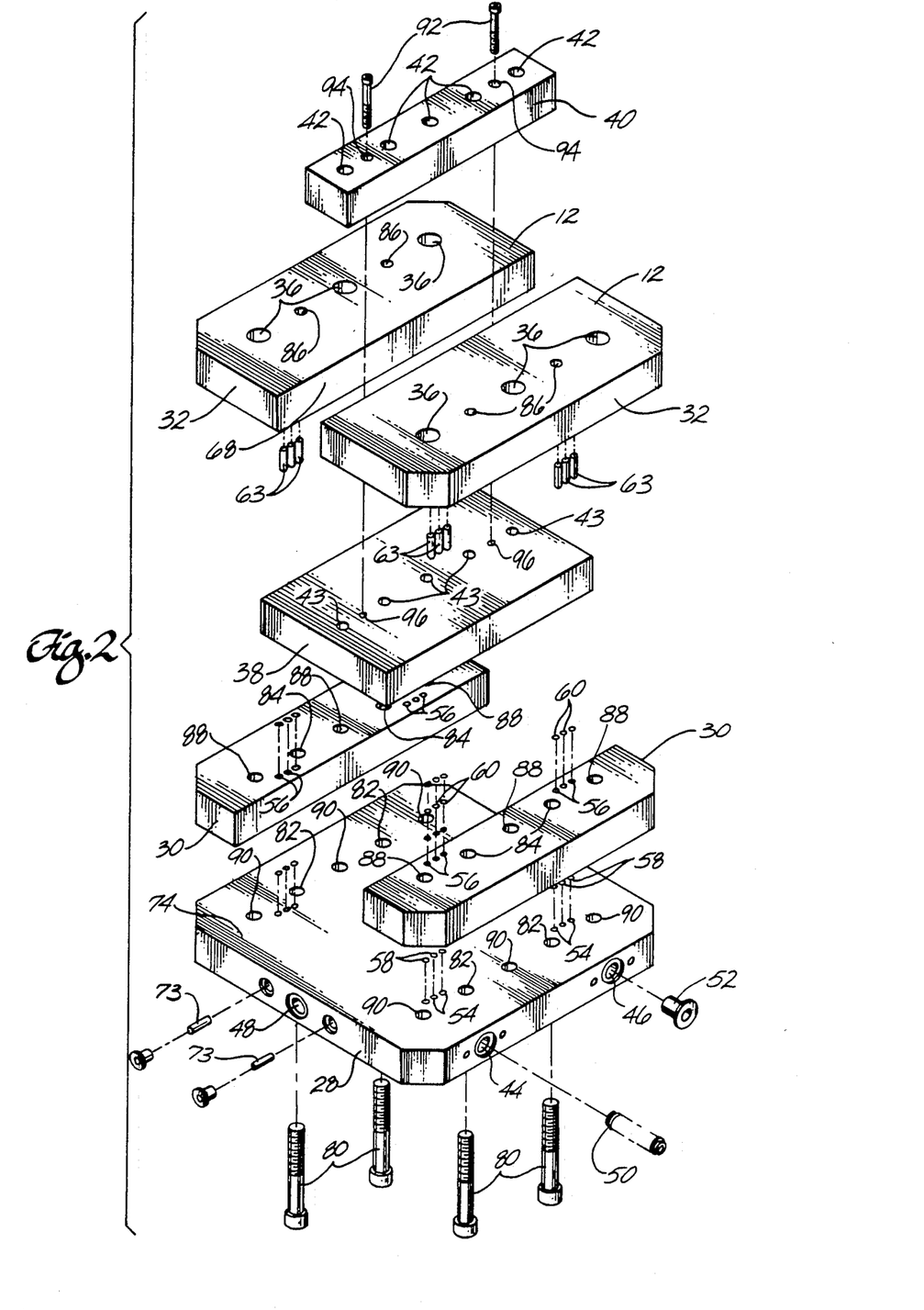
FIG. 2 is an exploded perspective view illustrating detailed construction of a linear bearing and slip plate guide assembly.
Figure 3:
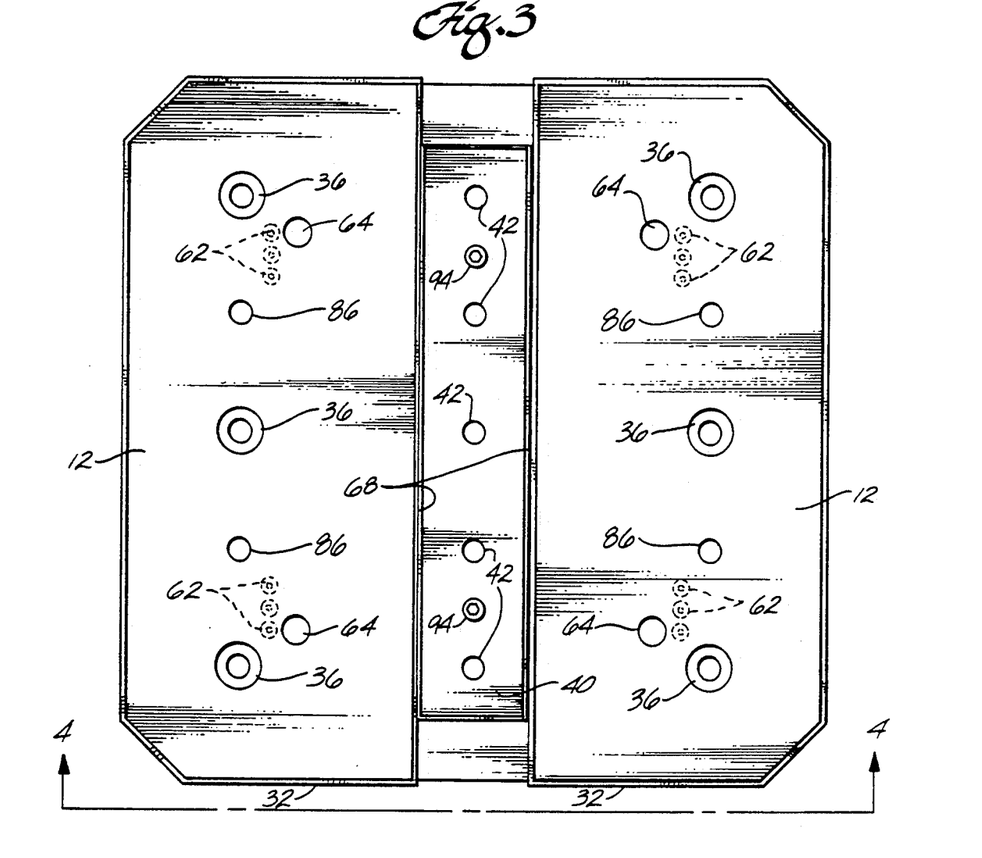
FIG. 3 is a top plan view illustrating assembled components of the bearing and slip plate guide assembly.
Figure 4:
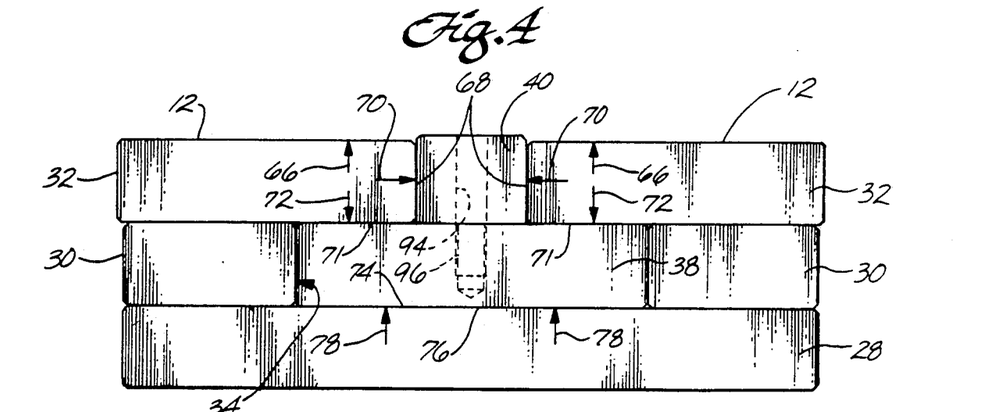
FIG. 4 is an elevation view taken on line 4—4 of FIG. 3.

FIGS. 2 through 4 illustrate more details of the preferred system for assembling components of the bearing and the slip table guide assembly. The slip plate 10 is not shown in FIGS. 2 through 4 for clarity. The bottom plate 28 has a pair of longitudinally spaced apart oil flow ports 44 and 46 opening through one side of the bottom plate. A similar pair of oil flow ports (not shown in FIG. 2) open through an opposite side wall of the base plate. A single oil flow port 48 opens through one end wall of the bottom plate, and a similar oil flow port (not shown in FIG. 2) opens through the opposite end wall of the bottom plate. In the illustrated embodiment, oil flow port 44 serves as an oil inlet port. FIG. 2 illustrates an oil pressure connector 50 which is positioned within the oil inlet passage 44. This oil pressure connector can control oil flow from the manifold 26 (FIG. 1) through the inlet port 44 and then to a main oil galley (not shown) within the bottom plate. FIG. 2 also illustrates a hex plug 52 which can be used to block oil flow from the port 46. If the base plate 28 is positioned adjacent to an identical bearing either to its side or adjacent to one of its ends, or both, oil flow from the manifold passes through the bottom plate and then into one or more of the adjacent base plates. In this instance, the hex plug or plugs are replaced with one or more of the pressure connectors 50 to control oil flow from the bottom plate to an adjacent bottom plate. Oil flow within the bottom plate 28 then passes from the bottom plate laterally through one or more of the side ports 44 or 46, or endwise through one of the end ports 48 into similar oil inlet ports in the bottom plates of adjacent bearings positioned adjacent to either side or either end of the base plate 28.

Referring to FIG. 2, lubricating oil passing into the inlet port 44 passes through the main oil galley and then through vertical oil passages 54 leading from the bottom plate 28 into corresponding vertical oil passages 56 in the middle plates 30. O-ring seals 58 seal the passages between the bottom plate and the middle plates. Lubricating oil passing through the middle plates then passes through corresponding sealed vertical oil passages 62 (see FIG. 3) in the top plates 32. Oil flow into the internal passages within the top plates 32 is controlled by separate sets of flow restrictors 63. Internal oil supply lines within the top plates 32 feed the lubricating oil to oil outlet ports in the top plates leading to three areas within the bearing as follows: (1) oil ports 64 (see FIG. 3) opening through the upper bearing surface 12 provide lubricating oil to the upper bearing surfaces in the direction of the arrows 66 shown in FIG. 4, for lubricating sliding travel of the slip plate on the upper bearing surfaces 12; (2) oil outlet ports (not shown) in the inside walls 68 of the top plates feed lubricating oil to the sides of the narrow upper bearing blocks 40 which slide in the narrow portions of the T-shaped channels 34, as represented by the arrows 70 in FIG. 4, and (3) oil outlet ports (not shown) along bottom wall portions 71 of the top plates 32 feed lubricating oil to the upper wall portions of the lower guide member bearing block 38 as represented by arrows 72 in FIG. 4.

Separately, lubricating oil flowing through flow restrictors 72 (FIG. 2) in the bottom plate 28 flows through the internal oil galley within the bottom plate 28 and then flows upwardly through vertical oil passages (not shown) for feeding lubricating oil to an upper surface portion 74 of the bottom plate 28, which faces upwardly along the bottom portion of the channel 34 (shown in FIG. 1). This lubricates a bottom wall 76 of the lower bearing block 38 on the slip plate guide bearing, as represented by the arrow 78 in FIG. 4.

Thus, oil under pressure is supplied to the interface between all surfaces of the T-shaped guide member in the T-shaped guide channel, as well as to all load bearing upper surfaces 12 of the bearings.

FIG. 2 also illustrates a preferred technique for fastening the bearing components together as a rigid unit. Bolts 80 extend upwardly through countersunk bores 82 in the base plate 28 and through aligned bores 84 in the middle plates 30 and are threaded into bores 86 in the top plates 32. The bolts 80 are tightened to hold the bottom plate 28 and the middle and upper plates 30 and 32 together as a rigid unit. Similar bolts (described below) extend downwardly through the bores 36 in the top plates 32, through bores 88 in the middle plates 30, through bores 90 in the bottom plate 28 and into threaded bores (not shown) in the base of the fixture for bolting the three-layer bearing components to the fixture as a rigid unit.

FIG. 2 also illustrates bolts 92 which extend downwardly through bores 94 in the narrow upper bearing block 40 of the bearing guide and into threaded holes 96 in the wide lower bearing block 38 of the bearing guide. The bolts 92 are fastened to hold the blocks 40 and 38 together as a rigid inverted T-shaped unit. This rigid unit is then affixed to the bottom portion of the slip plate 10 with fasteners (described below) threaded through the holes 42 in the blocks 40.

Figure 5:
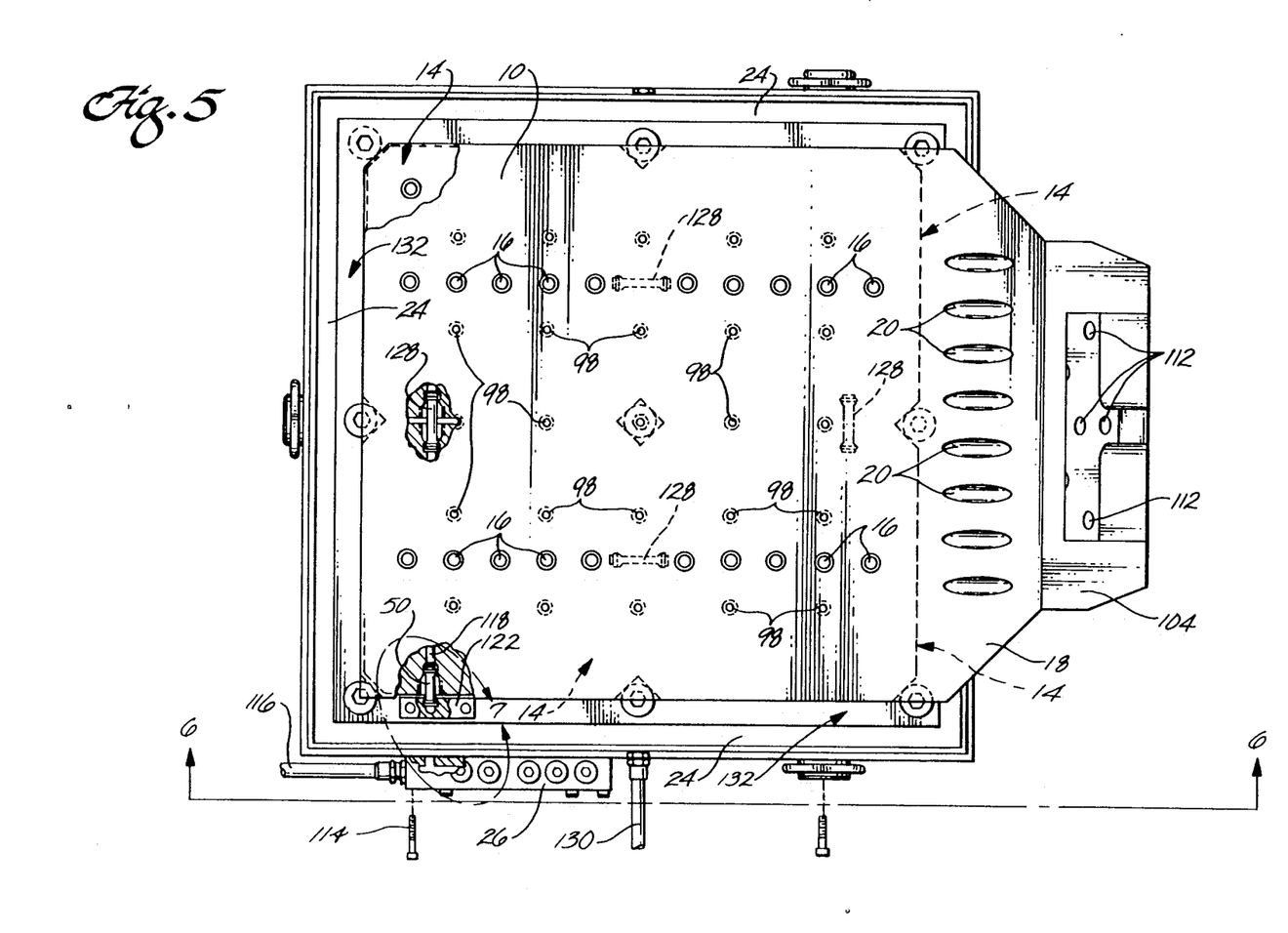
FIG. 5 is a top plan view, partly broken away, illustrating a slip plate assembled to the bearing assembly of this invention.
Figure 6:
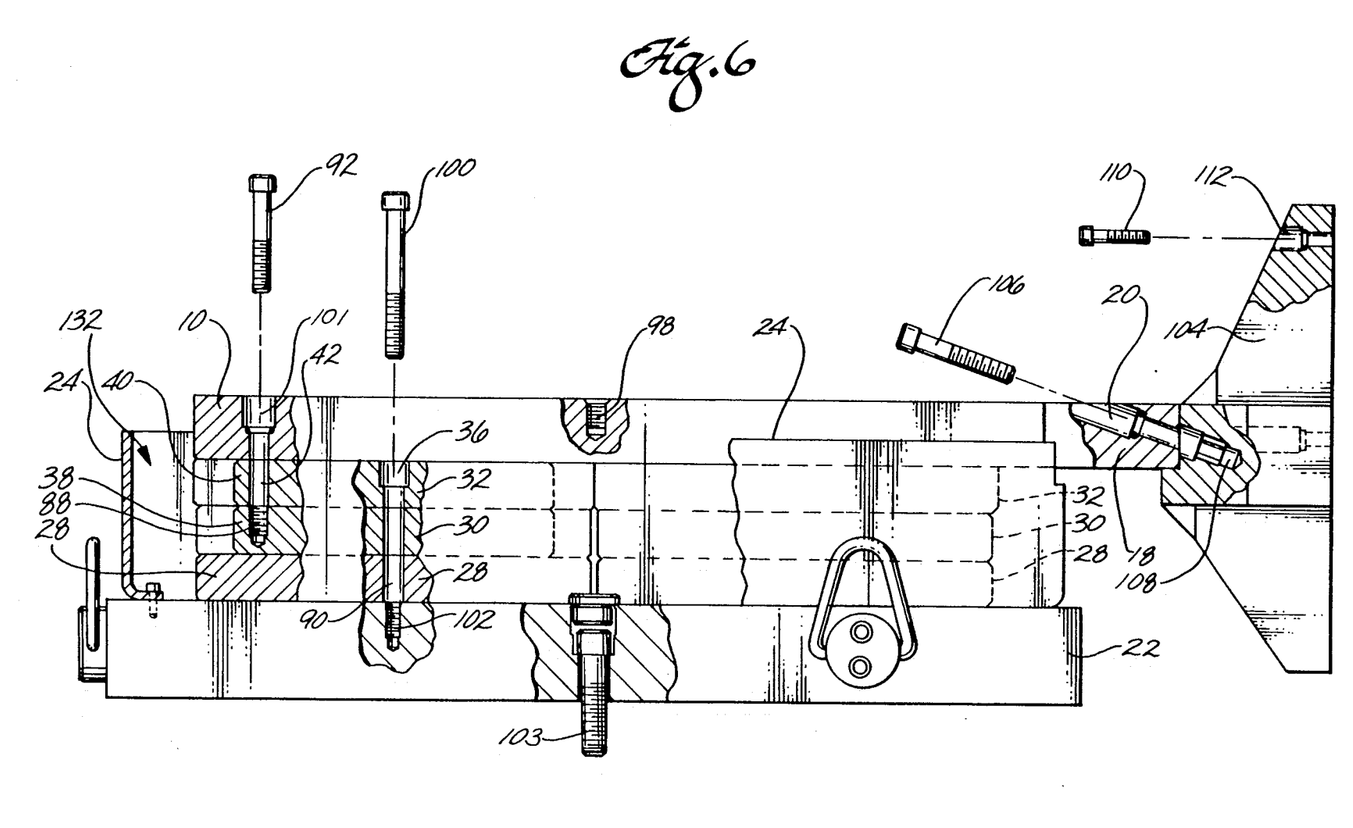
FIG. 6 is an elevation view, partly broken away and partly in cross section; taken on line 6—6 of FIG. 5.
Figure 7:
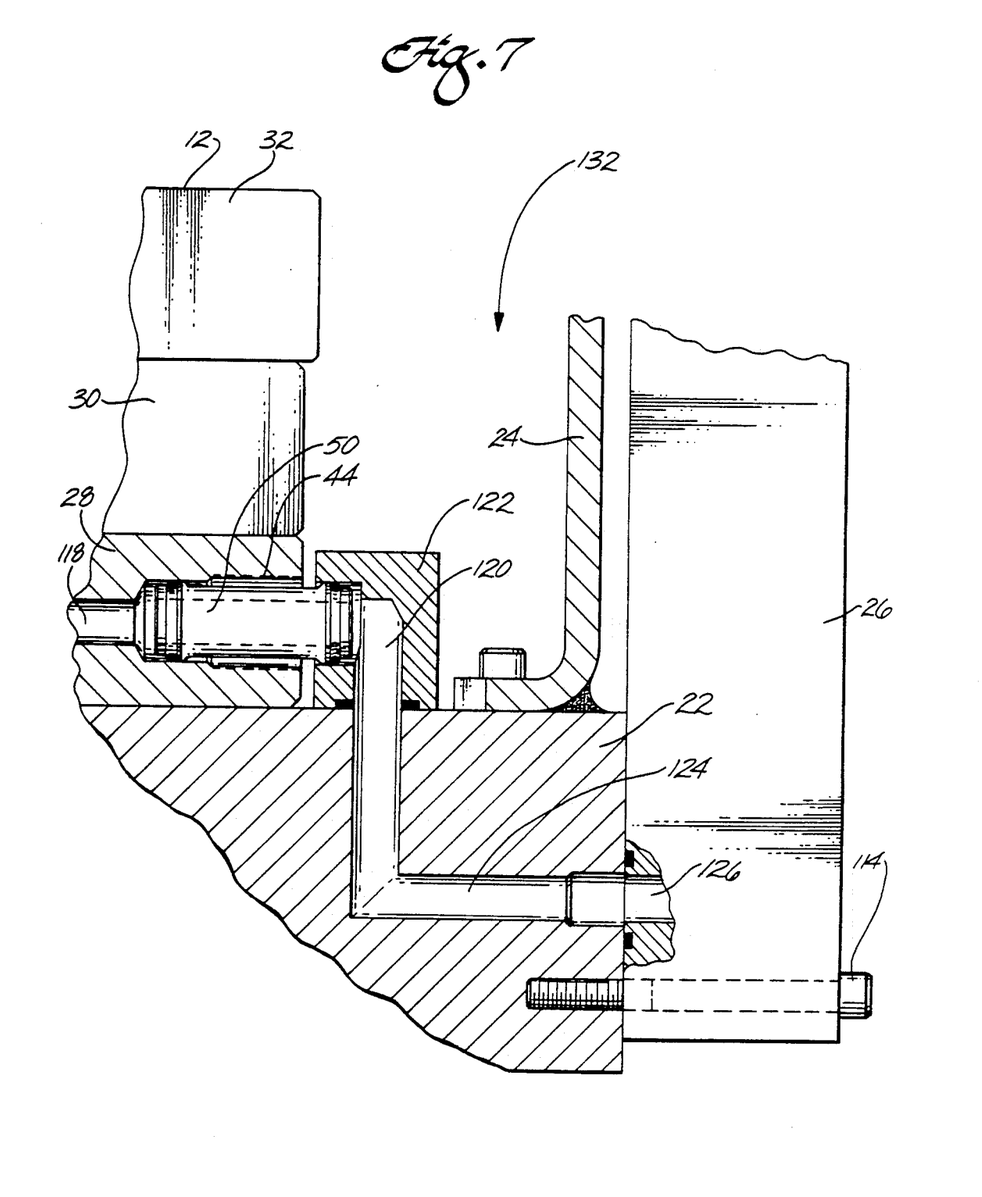
FIG. 7 is a fragmentary cross sectional view in vertical elevation showing the detail within the circle 7 of FIG. 5.

FIGS. 5 through 7 illustrate further details of the linear bearing assembly. FIG. 5 illustrates the top plan view of the slip plate 10. A side view of the slip plate is shown in FIG. 6. An article under test (not shown) is rigidly affixed to the top surface of the slip plate by fasteners (not shown) engaged in a grid pattern of inserts 98 in the top of the slip plate. The side view of FIG. 6 best illustrates alignment of the countersunk bores 101 in the slip plate with the straight-through bores 42 in the upper bearing block 40 and the threaded bores 88 in the lower bearing block 38. The fasteners 92 shown in FIG. 6 fasten the inverted T-shaped bearing block to the bottom of the slip plate.

FIG. 6 also illustrates alignment of the counterbores 36 in the top plates 32 with the straight-through bores 90 in the middle plates 30 and bottom plate 28. Fasteners 100 extend through these aligned bores and are threaded into corresponding internally threaded bores 102 in the base plate 22. This rigidly affixes the bearings to the base plate 22. The base 22 is affixed to a large rigid support structure such as a steel or steel and concrete mass (not shown) by a series of fasteners 103.

FIGS. 5 and 6 also illustrate a drive adapter 104 rigidly affixed to the end portion 18 of the slip plate by threaded fasteners 106 inserted through the counterbore holes 20 and into corresponding aligned bores 108 in the drive adapter. This rigidly affixes the drive adapter to the end of the slip plate to provide a means for applying to the slip plate a longitudinally reciprocating high-frequency vibration for shock or vibration testing of the test article carried by the slip plate. Fasteners 110 extend through a series of holes 112 in the drive adapter for connecting the slip plate to the vibration exciter (not shown).

FIGS. 5, 6 and 7 illustrate further details of the lubrication oil supply system. The manifold 26 is mounted to the side of the main base plate 22 by fasteners 114. An inlet oil pressure hose 116 delivers oil from an oil supply to the manifold for distribution and filtering prior to feeding the oil from the manifold into the main oil galleys within the bottom plates 28, initially through the pressure connector 50 in the inlet port 44. The pressure connector 50 is sealed to one end of an internal passage 118 in the bottom plate 28 which leads to the main oil galley. The opposite end of the pressure connector is sealed to the end of an oil supply line 120 in an inlet riser 122 sealed and rigidly affixed to the base 22 adjacent to the manifold. An internal oil supply line 124 in the main base 22 is sealed to an oil outlet port 126 in the manifold 26 for supplying oil from the manifold through the line 124 to the passage 118 through its connection to the pressure connector 50.

As best illustrated in FIG. 5, oil flow through the internal oil galley within the bottom plate 28 of the bearing 14, which initially communicates with the oil manifold 26, is interconnected with the oil galleys of the other bearings 14 in the fixture through further oil pressure connectors 128 sealed to and bridging the spaces between the adjoining bearings. This provides a means for circulating the oil under pressure from the manifold 26 through the set of four bearings and for returning the oil through a return hose 130 to the primary oil supply. FIGS. 5, 6 and 7 also illustrate the oil collector 24 which provides a rectangular outer peripheral wall for containing the oil supply in a moat 132 surrounding the set of bearings.

In use, and with reference to FIGS. 1 through 7, the article under test is subjected to vibration when carried by the vibrating slip table. The slip table is guided for single-axis longitudinal reciprocating travel along the T-shaped channels. The T-shaped guide members slide in their respective channels for guiding back and forth travel of the slip plate on the bearing surfaces 12 of the upper plates 32. Lubricating oil is supplied to the upper bearing surfaces 12 so that the load of the slip plate and the article under test is supported by a 100% lubricated upper linear bearing surface. The load of the slip plate and article under test is supported, in part, by the upper surface portion 74 of the bottom bearing plate 28, where the lower bearing block 38 slides back and forth on the bottom plate. This interface between the bottom of the bearing guide and the upper surface of the bottom plate 28 is 100% lubricated by the circulating lubricating oil. Thus, the upper bearing surfaces 12 of the top plates 32 and the upper surface portions 74 of the bottom plates 28, at the bottom of the T-shaped grooves, provide a combination of load supporting linear bearing surfaces which are 100% lubricated during single-axis travel of the slip plate during testing. The total load bearing surface area of the upper bearing surfaces 12 and the upper surface portions 74 of the bottom plates 28 is substantially greater than the nominal area of the slip plate.

During its vibration the slip plate is restrained from cross-axis motion, both laterally with respect to its axis of travel, and vertically with respect to the load bearing surfaces of the bearings. The inverted T-shaped bearing guide sliding in the inverted T-shaped channel provides this multiple axis means of restraint. The side wall portions 68 of the upper bearing plates 32 provide a means of restraint against relative lateral motion between the slip plate and the bearings. This area of contact between the bearing guides 40 and the side wall 68 of the upper bearing plates 32 is 100% lubricated by the circulating lubricating oil. Vertical restraint is provided by the bearing contact between the upper surface of the lower bearing guide 38 and the bottom surfaces 71 of the upper bearing plates 32. This means of restraint also is 100% lubricated by the circulating lubricating oil.

Preferably, linear travel of the slip plate with respect to the bearings is guided longitudinally by a close-tolerance fit established along one of the two parallel axes through the T-shaped bearing guide slots. This close-tolerance fit is preferably established at the side walls 68 of the upper bearing plates 32 and the adjacent bearing guide blocks 40 which are aligned longitudinally along one axis. In order to provide for continued reciprocating motion of slip plate without the slip plate binding or the like because of thermal expansion during use, greater tolerances are provided between the side walls 68 of the upper bearing plates and the bearing blocks 40 along the axis of the other pair of T-shaped bearing slots.

In summary, each bearing is designed to provide precision guidance of the slip plate through the use of the inverted T-shaped bearing element in conjunction with the oil film slip surface. The bottom plate 28 acts as the base of the bearing, as well as the bearing's manifold system. When positioned in the table assembly, the bottom plate becomes the direct interface with each adjoining bearing for the oil lubrication system.

The bottom plate 28 also acts as the lower bearing surface for the T-shaped bearing element. The center plates 30 act as a spacer between the bottom plate 28 and top plates 32 to provide a proper gap for the T-shaped bearing element. The center plates also serve as a manifold to direct the oil from the bottom plate to the top plates. The top plates provide precision bearing surfaces for the top of the T-shaped bearing element and also the bearing surfaces for the sides of the bearing element. The top plate also creates the upper slip surface for the slip plate.

In addition to the three-piece laminate, the bearing also includes the T-shaped bearing element, which becomes a moving element of the bearing. This moving element positions the slip plate at the appropriate height, relative to the top of the bearing, to provide the proper oil film gap.

Thus, the present invention provides a vibration test fixture using low oil pressure linear bearings combined with an oil film to provide a load capacity which can exceed the capacity of a standard high pressured journal bearings/granite slip table. The bearing design, in one embodiment, provides an oil film surface which exceeds the nominal table area by 27%. The increased oil film area provides excellent control of vertical cross-axis motions as well as increased damping of high-frequency resonances. The large oil film area results also in a bearing with high stiffness. Direct load path from plate to base is much stiffer than with journal bearings. In the illustrated embodiment, evenly distributed bearings are located directly below the slip plate mounting surface, and no matter where the test article is mounted on the table, it is always supported by bearings. However, in an alternative embodiment, it can be possible to utilize the individual bearing assemblies in a spaced apart relationship so as to support less than 100% of the nominal table area. In the illustrated bearing system, low pressure oil is ported through the base, which eliminates the need for oil ports in the slip plate. No expensive high-pressure pump is required.

What is claimed is:

1. A vibration test fixture having a slip plate adapted for carrying an article affixed thereto and having applied thereto a reciprocating sliding motion for use in shock or vibration testing of the article, comprising:
   hydrostatic bearing means affixed in a stationary position for supporting the slip plate for reciprocating sliding travel on the bearing means during testing, the bearing means having a generally planar, two-dimensional bearing surface to support a generally planar, two-dimensional lower surface of the moving slip plate;
   an elongated single axis guide member of generally T-shaped cross section for connection to the slip plate, the guide member extending away from the lower surface of the slip plate for sliding connection to a corresponding linear channel of generally T-shaped cross section in the bearing means for guiding said reciprocating sliding travel of the slip plate along a longitudinal axis of travel on said bearing surface, said sliding connection of the guide member to the linear channel including means for restraining lateral movement of the slip plate relative to the longitudinal axis of travel of the slip plate, and means for restraining vertical movement of said slip plate relative to the bearing surface during longitudinal travel of the slip plate;
   means for supplying a film of lubricating oil to the bearing surface for lubricating the reciprocating longitudinal travel of the slip plate on the bearing surface as the bearing surface supports the slip plate during said reciprocating longitudinal travel; and
   means for supplying a film of lubricating oil to the lateral and vertical restraining means for lubricating the travel of the generally T-shaped guide member relative to the generally T-shaped channel in the bearing means during said longitudinal travel of the slip plate.

2. Apparatus according to claim 1 including a base plate to which the bearing means are rigidly affixed, and further including means for circulating said lubricating oil through the base plate to the bearing surface and to the lateral and vertical restraining means.

3. Apparatus according to claim 1 in which a load imposed by the slip plate is supported by the bearing means; in which the slip plate has a nominal surface area; and in which the bearing surface area which supports the load of the slip plate is greater than the nominal area of the slip plate.

4. Apparatus according to claim 1 in which the single-axis guide member comprises an inverted T-shaped guide carried on the slip table and movable with respect to a corresponding inverted T-shaped channel in the bearing means, and in which a portion of said bearing surface is at the bottom of the inverted T-shaped channel in the bearing means.

5. Apparatus according to claim 4 including at least a pair of said bearing means mounted side-by-side in the fixture, thereby providing guided travel of the slip plate along first and second longitudinal axes in a pair of parallel inverted T-shaped channels, with corresponding pairs of inverted T-shaped guides movable in the respective channels.

6. Apparatus according to claim 5 including means for producing a closer tolerance fit of the guide member in the channels along the first axis than for the guide member in the channels along the second axis.

7. Apparatus according to claim 1 in which the fixture includes multiple bearing means mounted adjacent one another to provide continuous two-dimensional bearing surfaces across the adjacent bearing means to support the slip plate, and including means for supplying said oil to the bearing and bearing restraint surfaces of the multiple bearing means through a common oil pressure system.

8. A method for vibration and shock testing of an article under test, comprising the steps of:
   mounting a generally planar slip plate to a stationary bearing so that a generally planar, two-dimensional bearing surface of the bearing supports a generally planar, two-dimensional lower surface of the slip plate for single-axis reciprocating travel of the slip plate on the bearing surface;
   connecting an elongated guide member of generally T-shaped cross section to the slip plate so the guide member projects away from the lower surface of the slip plate and is slidably connected to an elongated linear channel of corresponding generally T-shaped cross section in the stationary bearing;
   mounting an article under test to the slip plate;
   applying a reciprocating linear actuating force to the slip plate for applying single-axis linear reciprocating travel to the slip plate for use in testing the article for shock or vibration, in which the connection of the generally T-shaped guide member to the corresponding generally T-shaped linear channel guides reciprocating travel of the slip plate on the bearing surface during testing of the article;
   the connection of the generally T-shaped guide member to the corresponding generally T-shaped channel restraining movement of the slip plate in directions lateral to its linear travel and vertically with respect to the bearing surface; and supplying a film of lubricating oil to the bearing surface for lubricating the two-dimensional bearing surface area which supports the bottom surface of the slip plate during its reciprocating linear travel, including supplying said film of lubricating oil to a generally T-shaped interface between the guide member and the corresponding channel to which the guide member is slidably connected to restrain said movement of the slip plate in the lateral and vertical directions during testing.

9. The method according to claim 8 in which a load imposed by the slip plate is supported by the bearing means; in which the slip plate has a nominal surface area; and including supporting the load of the slip plate on lubricated two-dimensional horizontal planar bearing surfaces having a greater combined surface area than the nominal area of the slip plate.

10. In a vibration test fixture having a slip plate to which a reciprocating motion is applied for vibration or shock testing of an article carried on the moving slip plate, an improved bearing system comprising a linear bearing for supporting a load imposed by the slip plate during single-axis travel of the slip plate along a planar, two-dimensional bearing surface atop the linear bearing, and in which the single-axis travel is guided by an elongated guide member of generally T-shaped cross section affixed tot he bottom of the slip plate and slidably connected to a linear channel of corresponding generally T-shaped cross section in the linear bearing for restraining cross-axis motion of the slip plate with respect to the bearing along axes orthogonal to the single axis of travel, means for lubricating the two-dimensional bearing surface area which supports the load of the slip plate during its reciprocating travel and means for lubricating areas of cross-axis restraint within the bearing at a generally T-shaped interface between the elongated guide member and the linear channel in the bearing so that the bearing provides a generally planar, two-dimensional means of bearing support for the load of the slip plate and a constantly lubricated slip surface for the single-axis travel and cross-axis restraint for the moving slip plate during testing.

11. A vibration test fixture of the type having a slip plate adapted for carrying an article affixed thereto and for having applied thereto a reciprocating movement for use in the shock or vibration testing of the article, the test fixture comprising:
a hydrostatic linear bearing affixed in a stationary position for supporting a load imposed by the slip plate during its reciprocating sliding travel on the bearing during testing:
a generally inverted T-shaped guide means extending along a bottom portion of the slip plate engaged for sliding, reciprocating movement in a corresponding inverted T-shaped groove formed along the bearing for providing guided, reciprocating, sliding movement of the slip plate along a longitudinal axis of travel on the bearing;
said inverted T-shaped guide means and its corresponding connection to the groove providing generally horizontal, two-dimensional bearing surfaces for supporting the load of the slip plate during its reciprocating travel on the bearing,
the inverted T-shaped guide means and its corresponding connection to the groove also providing a means to restrain lateral movement of the slip plate relative to the longitudinal axis of travel of the slip plate and to restrain vertical movement of the slip plate relative to said horizontal bearing surfaces during longitudinal travel of the slip plate; and
means for supplying a film of lubricating oil to all surfaces of the inverted T-shaped guide means and its corresponding inverted T-shaped guide means and its corresponding inverted T-shaped groove so that the horizontal bearing surfaces which support the load of the slip plate are lubricated by said oil film during reciprocating movement of the slip plate while also lubricating the travel of the slip plate relative to said means of restraining its lateral and vertical movement.

12. The method according to claim 9 in which the guide member is a single-axis guide member which comprises an inverted T-shaped guide element carried on the slip plate and movable with respect to a corresponding inverted T-shaped channel in the bearing, and in which a portion of the horizontal bearing surfaces is at a bottom of the inverted T-shaped channel in the bearing.

13. Apparatus according to claim 11, in which the stationary linear bearing is a modular bearing system including a lower portion forming a base of the inverted T-shaped groove, a pair of intermediate bearing plates spaced apart by a relatively wider distance to form a lower portion of the inverted T-shaped groove, and a pair of upper bearing plates spaced apart by a relatively narrower distance to form an upper narrow position of the inverted T-shaped groove.

14. Apparatus according to claim 13, in which the fixture includes a plurality of said modular bearing systems aligned longitudinally so that the T-shaped grooves in adjacent modular bearing systems are continuous.

15. Apparatus according to claim 14, including means for passing the lubricating oil from one bearing system to an adjacent bearing system.

16. A vibration test fixture comprising:
a slip plate adapted for carrying an article affixed thereto, and having applied thereto a reciprocating siding motion for use in shock or vibration testing of the article;
hydrostatic bearing means affixed in a stationary position for supporting a load imposed on the bearing means by the slip plate during reciprocating sliding travel of the slip plate on the bearing means during testing, the bearing means having a generally planar, two dimensional bearing surface to support a generally planar two-dimensional lower surface of the moving slip plate;
an elongated single-axis guide member for guiding said reciprocating sliding travel of the slip plate along a longitudinal axis of travel on said bearing surface, in which the single axis guide member comprises an inverted T-shaped guide carried on the slip table and movable in a corresponding inverted T-shaped channel in the bearing means, and in which a portion of said bearing surface which supports the load of the slip plate is at a bottom of the inverted T-shaped channel in the bearing means, including means for restraining lateral movement of the slip plate relative to the longitudinal axis of travel of the slip plate, and means for restraining vertical movement of the slip plate relative to the bearing surface during longitudinal travel of the slip plate; and means for supplying a film of lubricating oil to the bearing surface for lubricating said reciprocating longitudinal travel of the slip plate on the bearing surface as the bearing surface supports the slip plate during said reciprocating longitudinal travel, including means for supplying a film of lubricating oil to the lateral and vertical restraining means for lubricating the travel of the guide member relative to the channel in the bearing means during said longitudinal travel of the slip plate.

17. Apparatus according to claim 16 including at least a pair of said bearing means mounted side-by-side in the fixture, thereby providing guided travel of the slip plate along first and second longitudinal axes in a pair of parallel inverted T-shaped channels, with corresponding pairs of inverted T-shaped guide members being movable in the respective channels.

* * * * *

UNITED STATES PATENT AND TRADEMARK OFFICE
CERTIFICATE OF CORRECTION

PATENT NO. : 4,996,881
DATED : March 5, 1991
INVENTOR(S) : R.C. Tauscher; D.L. Baughn; W.B. Woyski It is certified that error appears in the above-identified patent and that said Letters Patent is hereby corrected as shown below:

On the title page:

Abstract, line 7, after "system" delete "of"; insert --for--.

Column 5, line 30, change "block" to -- blocks --.

Column 6, line 29, delete "72", insert --73--.

Column 11, line 27, change "tot he" to -- to the --.

Column 12, line 43, change "siding" to -- sliding --.

Signed and Sealed this

Twenty-seventh Day of October, 1992

Attest:

DOUGLAS B. COMER

*Attesting Officer*      Acting Commissioner of Patents and Trademarks